United States Patent Office 2,899,486
Patented Aug. 11, 1959

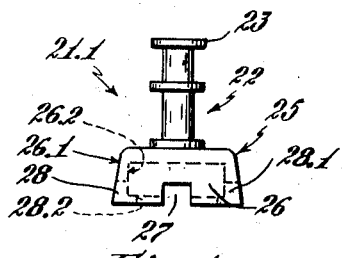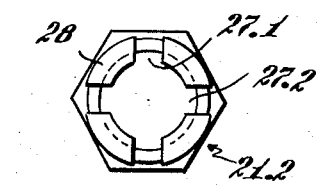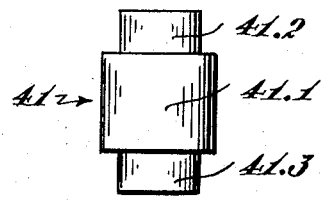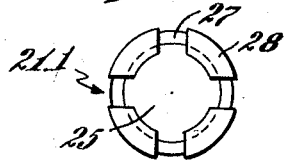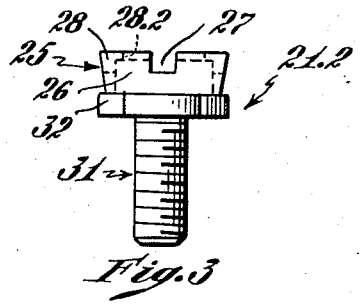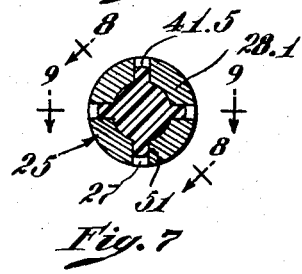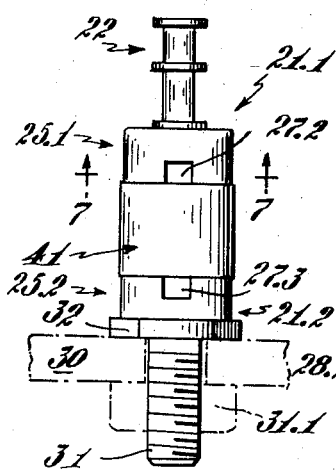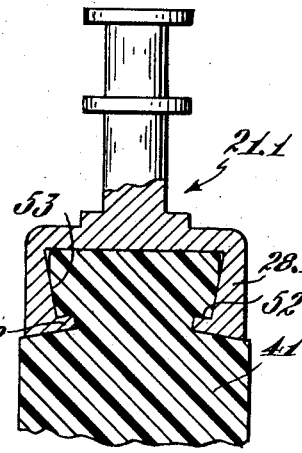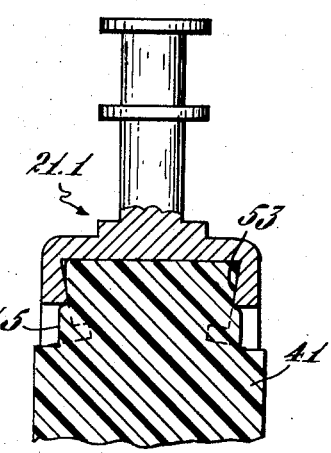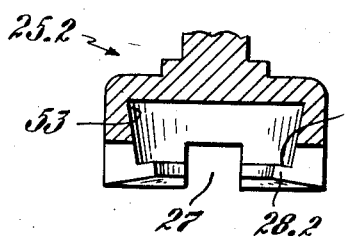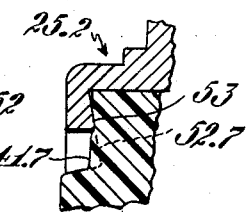

2,899,486

INSULATING MOUNT

Ralph Abrams, Sharon, Mass., assignor to Cambridge Thermionic Corporation, Cambridge, Mass., a corporation of Massachusetts Application April 3, 1956, Serial No. 575,757

6 Claims. (Cl. 174—166)

This invention relates to insulating mounts for use in electric apparatus, of the stand-off type which can be fastened with one end to a support such as a panel and which has at the other end, separated from the support by an insulating body, means for joining thereto electric conductor means.

Objects of this invention are to provide devices of the above type which are especially suited for the use of superior insulating materials of the type which have little elastic tendency to return to an original shape after having been suddenly deformed or at least a tendency to become permanently deformed under continuous stress, but have a comparatively high tendency to flow gradually, due to low internal molecular friction, which materials are ill suited for incorporation in conventionally designed devices of this type, to provide improved devices incorporating such materials that lend themselves for assembly with metal parts according to conventional mass production techniques, to provide such devices which can be manufactured with a minimum amount of molding, machining, and assembling operations, to provide such devices which are electrically and mechanically efficient and exceptionally strong, and to provide a construction which lends itself especially well to the miniaturizing of such devices.

Briefly stated by way of a summary indicating its nature and substance, the invention comprises a body of insulating material of low elasticity and interior friction, and at least at one end of this body a head with a metallic socket cup having teeth that extend in axial direction and also penetrate radially into the insulating body upon assembly therewith, whereas the inside of the socket cup fits the end of the insulating body prior to assembly so that, if the body is inserted into the cup and the teeth are then pressed inwardly, comparatively large contact surfaces are created which reduce the possibility of flow thereon thereby preventing relative rotation of body and rocket as well as axial separation thereof.

In another aspect of the invention the teeth have inwardly protruding tips which increase the contact surface areas between the metallic socket and the insulator body, which modification is especially suited for insulating materials of the above type which have a pronounced tendency to flow, such as polytetrafluoroethylene resins.

In an important practical embodiment, an essentially cylindrical insulating body is used which is at both ends reduced in diameter so that upon assembly the ends fit into the insides of two socket cup blanks clearing the teeth, the outside diameters of the socket blanks being somewhat greater than the unreduced diameter of the insulating body, so that upon compression of the teeth inwardly, they penetrate into the ends of the body and the outside surface of the respective socket becomes essentially flush with the unreduced cylindrical surface of the insulator body.

In a further important aspect, the invention includes a socket head blank for insulating mounts of the type herein described, comprising on one side a mounting member such as a screw spindle or a soldering lug and on the other side a socket cup having an essentially cylindrical inside surface, a frusto-conical outwardly diverging outside surface, and teeth that are integral therewith within the confines of the outer socket surface. In an embodiment which is preferred for insulating material which has a pronounced tendency to flow, the teeth have inwardly protruding tips. Upon assembly of such a blank with the insulating body, the end of the body can be fitted inside the teeth, the cup wall can then be pressed inwardly essentially to a diameter of the insulating body, such that the teeth with or without inwardly protruding tips become displaced into the space which was defined by the inner cylindrical surface of the blank prior to assembly, whereby the insulating body is deformed to penetrate into the spaces between the teeth, thus providing large contact surfaces between socket teeth and insulating body which prevent relative rotation as well as pulling apart of socket and insulating body, confining the end of the insulating body within a space which it tends to fill and from which it cannot escape.

These and other objects and aspects of novelty of the invention will appear from the following description of several typical embodiments thereof illustrating its novel characteristics. This description refers to a drawing in which—

Fig. 1 is a side view of a head blank according to the invention;

Fig. 2 is an axial view of such a blank;

Fig. 3 is an elevation similar to Fig. 1, of another embodiment of a head blank;

Fig. 4 is a view, similar to Fig. 2, of the embodiment according to Fig. 3;

Fig. 5 is a side elevation of an insulating body according to the invention ready for assembly with head blanks such as illustrated in Figs. 1 to 4;

Fig. 6 is an elevation of a complete assembly according to the invention, incorporating the components according to Figs. 1 to 5;

Fig. 7 is a section on lines 7—7 of Fig. 6;

Fig. 8 is an enlarged section with the second end of the insulating body omitted, on lines 8—8 of Fig. 7;

Fig. 9 is a section similar to Fig. 8 on lines 9—9 of Fig. 7;

Fig. 10 is a section, similar to 9, but without the insulating body; and

Fig. 11 is a section in part of an assembled socket cup such as shown in Figs. 7 to 9 but without inwardly protruding tips.

Figs. 1 to 5 illustrate the components, prior to assembly, of a device according to the invention, which is in its entirety shown in Fig. 6 and which consists essentially of two metallic heads 21.1, 21.2 shown in Figs. 1 and 2, and 3 and 4 respectively, and of an elongate body of insulating material shown in Fig. 5. Each head has a mounting member 22 or 31 and a socket cup portion 25. The socket cup portions are essentially identical, whereas the mounting members will usually be of different shape, depending on the use of the insulator.

In the present embodiment one of the heads, namely 21.1 has on one side a solder lug 22 with one or two conventional flanges 23. On the other side is a socket cup 25 which is in Fig. 1 shown in the condition prior to assembly. It has a recess 26 whose frusto-conical outer wall 26.1 diverges outwardly towards the opening of the cup. The inner wall 26.2 is cylindrical. The basic cup shape is modified by slots 27 which reach about half-way down into the cup, forming teeth 28. The shanks 28.1 of the teeth are preferably provided with inwardly protruding tips 28.2. This structure can be conveniently formed by machining the cup with a complete wall having an inwardly protruding flange. Two diametrical cuts 27.1, 27.2 (Fig. 4) are then applied which provide the shanks 28.1 and the tips 28.2. While the tips 26.2 are preferred for use with a particular type of insulating material, it is understood that they are not absolutely necessary and can for certain purposes be omitted, as will be described below with reference to Fig. 11.

The second head 21.2, shown in Figs. 3 and 4, is identical with the solder lug head 21.1, so far as the socket cup portion 25 is concerned, but has instead of the solder lug a threaded shank 31, which together with a hexagonal portion 32 serves for mounting it on a support.

It will be understood that the above described mounting members such as the solder lug 22 and the threaded shank 31 are merely examples for various devices which can be electrically separated by the insulating body 41, and it will also be understood that in some cases only a single head can be used, when it is preferable and feasible to mount the insulating body directly on a support, or to mount it by means that do not envolve structures similar to the socket cups 25.

The insulating body shown in Fig. 5 consists of an insulating or stand-off portion proper 41.1, and of two end portions 41.2 and 41.3 which are slightly diminished in diameter as compared to the stand-off portion 41.1, in order to accommodate the teeth 28 with or without tips 28.2 upon insertion of an end portion 41.2 or 41.3 into the socket cup of a head.

The body 41 is made of insulating material of the peculiar type for which, as mentioned above, the herein described construction is especially suited. This material comprises certain synthetic compounds which have particularly favorable electrical properties, such as polyethylene, polychlorotrifluoroethylene and polytetrafluoroethylene resins, commercially available under the trade names Alathon, Kel-F and Teflon, respectively. These materials exhibit peculiar properties which make them unsuitable for conventional assembly with metal components. They are non-adhesive, inelastic in the sense that they have a poor memory of previous shape, and of comparatively low viscosity in the sense that they have a low internal friction so that they are easily deformable and flow around obstructing surfaces.

The present invention utilizes the easy flow characteristics of such materials for purposes of a deeply interpenetrating pressurable assembly technique while avoiding the detrimental effects of this flowing phenomenon by correlating bodies of these synthetics with metal components in such a manner that the surfaces of contact between the two components are large enough to provide sufficient molecular friction within the synthetic adjacent thereto to prevent flow thereon. Further according to the invention, such surfaces are applied across all directions along which separation by flowing could be possible.

Upon assembly, the end portion 41.2 or 41.3 of the body 41 is fully inserted into the cup 26 whereupon the tooth portions 21.8 and to some extent also the cup wall portions therebelow are pressed inwardly by means of a suitable conventional stacking tool, and sufficiently compressed to force the insulating material into the spaces between the teeth, as clearly shown in Figs. 7, 8 and 9. This compression brings the outside diameter of the socket cup of the head to a dimension that is somewhat smaller than that of the intermediate insulator portion 41.1, as indicated in Fig. 6.

Fig. 6 indicates a possible way of mounting the insulator on a panel 30 by means of the stud 31 and a nut 31.1.

The deformation of the socket cup is indicated in Fig. 10 and it will be apparent that, as compared to the cup blanks shown in Figs. 1 and 4, the assembled cup has a considerably reduced volume practically equal to that of the end of body 41 which now fills it and overflows into the cuts 27. Figs. 7, 8 and 9 show how the insulating material of ends 41.2 and 41.3 flows around the teeth and tips 28.1 and 28.2 and penetrates into the slots between the teeth. Thus, due to the possibility of easily deforming materials of the above characterized type, it is possible to obtain the configuration as shown in Figs. 7 to 9 which configuration at the same time increases the surfaces of contact between the socket cup and the insulator ends to such a degree that the latter cannot pull from the cup or rotate therein.

These surfaces are indicated at 51 (Fig. 7), between the insulating body and the longitudinal teeth slot faces where they prevent relative rotation of the insulator and the cup, and at 52 and 53 (Figs. 8 and 9), where they prevent relative motion, or pulling apart, in axial direction.

Fig. 11 shows the above mentioned embodiment without the tips 28.2 of the preceding figures, and indicates that the insulating material will in this case also flow into the spaces between the teeth, as shown at 41.7. Although the flow resisting contact surface areas are in this instance somewhat smaller than those according to Figs. 7 to 9, they are sufficient for materials which have somewhat lower viscosity, such as polyethylenes and polytetrafluoroethylene as compared to polychlorotrifluoroethylenes.

It should be understood that the present disclosure is for the purpose of illustration only and that this invention includes all modifications and equivalents which fall within the scope of the appended claims.

I claim:

1. An insulating mount comprising: an elongate body of insulating material having physical properties characteristic of polyfluoroethylenes such as appreciable tendency to flow due to low internal friction and little tendency elastically to return, after deformation, to an original shape; and at an end of said body a metallic head having on one side a mounting member and on the other side a socket cup with teeth extending in axial direction from the rim of the cup with radially extending slots therebetween which slots are narrow as compared with the peripheral width of said teeth which teeth protrude inwardly to confine said end of the body within the essentially continuous inner surfaces of the cup and the teeth, said material substantially filling said cup and penetrating into said slots between said teeth; whereby said material of said body can be deformed within said cup to provide at said teeth contact surfaces which are sufficiently large to reduce the flow thereon to a degree that substantially prevents relative rotation of body and head as well as linear separation thereof.

2. A mount according to claim 1, wherein said body consists essentially of a polyethylene compound.

3. A mount according to claim 1 further comprising tips integral with said teeth which tips protrude radially into said end of said body.

4. A mount according to claim 3, wherein said body consists essentially of polytetrafluoroethylene.

5. An insulating mount comprising: an essentially cylindrical body of insulating material of the polyfluoroethylene type which can be easily deformed, has a tendency to flow due to low internal friction, and has little tendency to return to an original shape after deformation; two metallic heads, one at each end of said body, and each having on one side a socket cup with teeth extending in axial direction from the rim of the cup with radially extending slots therebetween which slots are narrow as compared with the peripheral width of said teeth which teeth protrude inwardly to confine said end of the body within the essentially continuous inner surfaces of the cup and the teeth, said material substantially filling said cup and penetrating into said slots between said teeth; on the other side of one of said heads a threaded stud; and on the other side of the other head an electric terminal means; whereby said material of said body is deformed within said cup to provide at said teeth contact surfaces which are sufficiently large to reduce the flow thereon to a degree that effectively prevents relative rotation of body and heads as well as linear separation thereof.

6. A socket cup blank for insulating mounts of the type herein described, comprising: on one side a mounting member and on the other side a socket cup having an essentially cylindrical inner surface, a frusto-conical outwardly diverging outside surface continuously extending from the bottom of said cup and having radial slots such as to form teeth of appreciable peripheral width as compared to the width of the slots, said teeth extending longitudinally from the rim of the cup within the confines of said outside surface; whereby, upon assembly with a body that fits said inside surface, said outer surface can be pressed into essentially cylindrical shape with the teeth becoming displaced inwardly into the space which is defined by the inner surface of the blank prior to assembly.

References Cited in the file of this patent

UNITED STATES PATENTS

| 435,505 | Lieb | Sept. 2, 1890 |
| 456,600 | Seibert | July 28, 1891 |
| 1,828,402 | Geyer | Oct. 20, 1931 |
| 2,182,998 | Upton | Dec. 12, 1939 |
| 2,592,698 | Hubbard | Apr. 15, 1952 |
| 2,785,219 | Rudner | Mar. 12, 1957 |

FOREIGN PATENTS

| 641,917 | Great Britain | Aug. 23, 1950 |

OTHER REFERENCES

Modern Plastics Encyclopedia, 1947, vol. 1, page 154.